United States Patent
Rayalu et al.

[11] Patent Number: 5,965,105
[45] Date of Patent: Oct. 12, 1999

[54] PROCESS FOR THE SYNTHESIS OF FLYASH BASED ZEOLITE-A

[75] Inventors: Sadhana Rayalu; Nitin Kumar Labhasetwar; Purushottam Khanna, all of Nagpur, India

[73] Assignee: Council of Scientific and Industrial Research, Rafimarg New Delhi, India

[21] Appl. No.: 09/096,821

[22] Filed: Jun. 12, 1998

[51] Int. Cl.$^6$ .................................................. C01B 39/14
[52] U.S. Cl. .................. 423/712; 423/709; 423/DIG. 24
[58] Field of Search ..................................... 423/700, 709, 423/712, DIG. 24

[56] References Cited

U.S. PATENT DOCUMENTS 4,310,496  1/1982  Achenbach et al. .

FOREIGN PATENT DOCUMENTS

| | | |
|---|---|---|
| 265389 | 3/1989 | Germany . |
| 7034018 | 2/1982 | Japan . |
| 3182214 | 7/1988 | Japan . |
| 3040914 | 2/1991 | Japan . |
| 3040915 | 2/1991 | Japan . |
| 3045512 | 2/1991 | Japan . |
| 7109117 | 4/1995 | Japan . |

OTHER PUBLICATIONS

Dwyer, John et al. "Zeolites for Industry." Chemistry and Industry, (Apr. 1984), pp. 237–240.

Dyer, Alan "Uses of Natural Zeolites." Chemistry and Industry, (Apr. 1984), pp. 241–245.

Townsend, Rodney P., "Ion exchange in zeolites—basic principles." Chemistry and Industry, (Apr. 1984), pp. 246–253.

Rees, Lovat V.C., "Adsorption and diffusion of gases in zeolites." Chemistry and Industry (Apr. 1984) pp. 252–257.

Dwyer, John, "Zeolite structure, composition and catalysis." Chemistry and Industry (Apr. 1984) pp. 258–269.

Rao, A.V. Rama, et al., "Synthesis of nitriles from carboxamides with zeolite." Chemistry and Industry (Apr. 1984) pp 270.

Jones, R Alan, et al. "An unusual pyridazine ring–opening reaction." Chemistry and Industry (Apr. 1984) pp. 270–271.

Sangwan, Naresh K., et al., Silica gel as a potential catalyst for isomerisation of substituted 2–hydroxychalcones to the corresponding flavanones. (Apr. 1984) p 271 *Chemistry & Industry*.

Bhattacharya, A. et al., "Studies on the Synthesis of SAPO–5." J. Chem. Tech. Biotechnol, No. 54, (1992) pp. 399–407 (no month).

Singer, A., et al., "Cation Exhange Properties of Hydrothermally Treated Coal Fly Ash." Environ. Science & Technology, vol. 29, No. 7 (1995) pp. 1748–1753 (no month).

(List continued on next page.)

*Primary Examiner*—Mark L. Bell
*Assistant Examiner*—David Sample
*Attorney, Agent, or Firm*—Ladas & Parry

[57] ABSTRACT

The present invention relates to a process for synthesis of flyash based Zeolite-A, said process comprising grinding and mixing of flyash and caustic soda in a ratio of 1:1.2 and optionally adding sodium aluminate or aluminium hydroxide to obtain a fine homogeneous fusion mixture; heating the said mixture in an inert vessel at about 500–600° C. for about 1–2 hrs. to obtain a fused mass; cooling, milling, and mixing the said fused mass in distilled water for about 8–10 hrs. with simultaneous optional additon of sodium aluminate or alum solution, in the present or absence of NaCl followed by optional addition of zeolite-A seeding to obtain amorphous alumino -silicate slurry; subjecting the said slurry to hydrothermal crystallisation at about 90–110° C. for 2 to 4 hrs. to obtain Zeolite-A crystals; and washing the said crystals with water and then subjecting the washed crystals to oven drying at about 50–60° C. to obtain the FAZ-A crystals.

18 Claims, 2 Drawing Sheets

OTHER PUBLICATIONS

Lin, Cheng–Fang, et al., "Resource Recovery of Waste Fly Ash: Synthesis of Zeolite–like Materials." Environ. Science & Technology, vol. 29, No. 4 (1995) pp. 1109–1117 (no month).

Schwuger, Milan J., et al., "Inorganic Builders." Detergency (1987) pp. 373–395 (no month).

Bhatt, M.A., "Zeolite A: A Versatile Builder." Chemical Weekly, (1995) pp. 147–156 (no month).

Kumar, Nisha L., et al. "Zeolite (ZSM–5) synthesis from rice husk for xylene isomerization." Research and Industry, (Sep. 1992) pp. 141–142.

PROCESS FOR THE SYNTHESIS OF FLYASH BASED ZEOLITE-A

FIELD OF THE INVENTION

This invention relates to the production of A-type flyash based Zeolite-A(FAZ-A). More particularly, this invention relates to 4-A type flyash based zeolite (FAZ-4A) with improved characteristics for its application as a detergent builder. Use of flyash as a raw material results in cost-effective production of Zeolite-A, with concomitant resolution of flyash disposal problem by way of its high value utilisation.

The present work, in general, relates to a novel family of crystalline compositions and to the method for their cost-effective synthesis. More particularly, it relates to crystalline microporous aluminosilicate compositions and to the process for preparing the same.

BACKGROUND OF THE INVENTION

Molecular sieves of the crystalline zeolite type are well known in the art and now comprise over 250 species of both naturally occurring and synthetic compositions. In general, the crystalline zeolites are aluminosilicates whose frameworks are formed from $AlO_4$ and $SiO_4$ tetrahedral joined by the oxygen atoms and characterized by having pore openings of uniform dimensions, having significant ion-exchange capacity and being capable of reversibly desorbing an adsorbed phase which is dispersed through the internal voids of the crystal, without displacing any atoms which make up the permanent crystal structure.

In the prior knowledge, the method of preparation of Zeolite-A phase is generally known from sodium silicate/aluminate and from kaolinite. The smallest building units of Zeolite-A are tetrahedral in which a central metal ion like $Sl^{4+}$ or $Al^{3+}$ is tetrahedrally surrounded by four oxygen atoms. This way, the sodalite unit is formed which is composed of 24 tetrahedra. If sodalite units are linked together at their six quadratic planes via quadratic prisms, the structure of Zeolite-A is formed. It contains large cages, with a near spherical shape and free diameter of 1.14 nm. Each of this cages is connected with six neighboring cages via-8 membered rings (8-MR) or windows with a crystallagraphic diameter of 0.41 nm. Actually, the effective diameter and hence, the critical pore width of Zeolite-A can be manipulated by proper choice of the nature of the cations which are required to compensate the negative lattice charge brought about by each $AlO4^{2-}$ tetrahedron. The effective pore width of zeolite Na-A is 0.4 nm. The general chemical formula of the synthetically produced, anhydrous, porous, Zeolite-A expressed in terms of moles may be as follows: $1.0\pm0.2\ Na_2O:Al_3O_2:nSiO_2$ wherein n has a value from 1 to 1.5 These are commercially more useful as adjuvants or detergent builders as they have proven high exchange capacity.

The detergents used in the household, in commercial establishments and in industry, frequently contain large quantities of condensed phosphates, particularly tripolyphosphates. These are provided to sequester the hardness formers of water and are responsible, to a great extent, for increasing the cleaning power of the capillary active washing substances. The phosphate content of these agents leads to environmental problem viz. eutrophication and hence restrictions on these have been imposed in many countries, throughout the world. A solution to this is set forth with the development of a process for synthesis of economically viable material (FAZ-A) which can be a potential substitute for phosphates in detergents.

Use of flyash as a raw material for production of zeolites would provide an inexpensive alternate to commercially available zeolites (as the process involves replacement of conventional alumina and silica sources with flyash) with concomitant resolution of flyash disposal problems. Special emphasis has been given to synthesis of detergent grade Zeolite-4A from flyash as this particular zeolite is the most suitable substitute for conventional phosphatic detergent builder. Although extensive literature on synthetic methods of Zeolites (Kessler, H, 9th Proc. Inst. Zeo Cong. 1,-73–125, 1992 Dwyer, J. Chem Ind., 7,258–269, 1984 Bhattacharya, A. Das, J., Mitra, S. and Ray, S. K. J. Chem Tech Biotech., 54, 399–407, 1992) using salts of silicates, phosphates/aluminates, clay and clay minerals are available; use of waste materials to synthesize zeolites have not received much attention. Hydrothermal synthesis of kaolinite from blast furnace slag has been reported (Miyawaki, Ritsuo, Tomwa, Shimji, Inukai, Kogaku, 34(1)11–12, 1994 (Japanese). - Harvath,l Gyulo and Sasvari Judit, Kahazt, 127(2), 78–81, 1994) which is a precursor for zeolite synthesis. Formation of sodiumaluminate-silicate hydrates in the Bayer's liquor has been reported recently (Harvath, Gyulo and Sasvari Judit, Kahazi, 127(2), 78–81, 1994), while synthesis of zeolite form waste water treatment sludges and incineration ashes have also been reproted (Sawazaki, Tesuo, Jpn, Kokai Tokkya, JP 06,239, 612 Aug. 30, 1994 Sawazaki, Tetsuo. Jpon Kokai Tokkya Kohio, JP 06, 256-012 Sep. 12, 1994)

In particular, use of flyash to synthesize zeloltes have been attempted by a very few researchers. Pioneering research in the field of zeolite detergency has been initiated by Schwuger et al. Zeolites have been used a phosphate substitute in laundry detergents on a large scale in USA, Japan and Germany. For example, Procter and Gamble Co. marketed "Tide", a heavy duty powder detergent in USA, while leading detergent "Top" marketed by Lion corporation was reformulated to phosphate-free zeolite built product in Japan. In Germany, Henkel KGaA has introduced zeolite based detergent brand "Prodixan" while "Henko" a new product based on zeolite formulation has recently been marked in India.

It is also believed that leading companies like Procter and Gamble and Hindustan Lever are already using zeolites in some of their formulation in India. Recently, work has been published by Bhat emphasizing the use of zeolite as a versatile detergent builder.

In general, zeolite synthetics from flyash involves alkaline treatment using caustic soda solution (NaOH) at temperature of 80–100° C. Most previous studies (Singer, Arich, Berkagat, Vadium, Env. Sci & Technol 29(9), 1748–53, 1995 Cheng-Fang, Lin and Hsing-chang His, Env., Sci & Technol 29, 1109–1117, 1995) evaluated conversion of flyash to zeolite like materials under ambient pressure conditions and did not properly explore the factors affecting zeolite formation. The direct treatment of flyash using caustic soda (NaOH) solution requires prolonged hydrothermal treatment for 24–48 hrs and is an energy intensive step. This is a major disadvantage and has been overcome in the invention by using optimised fusion step. The direct treatment of flyash with caustic soda (NaCH) solution also favours the formation of sodalite which is an undesirable component for detergent formulations. In addition, it has high fraction of unreacted flyash and the yield of zeolite phases is significantly low. In particular, Zeolite. A formation is negligible without modification of $SiO_2/Al_2O_3$ ratio in the reaction mixture by way of alumina addition.

OBJECTS OF THE PRESENT INVENTION

Accordingly, in order to overcome the said drawbacks, the applicants have devised a simple process for the synthesis of FAZ-A with improved characteristics as detergent builder.

Another object of the invention provides a cost-effective process for the synthesis of flyash based zeolite A (FAZ-A) using optimised/modified fusion step and subsequent hydrothermal conditions.

Yet another object of the present invention relates to synthesis of FAZ-A by fusing flyash with sodium hydroxide. Accordingly, a homogeneous fusion mixture was prepared by proper grinding and mixing of flyash and caustic soda in a ratio of about 1:1.2. This mixture was heated to at least about 500° C., preferably between 550–600° C. for about 1–2 hrs. to obtain the fused mass. The resultant fused mass was cooled, milled, and mixed thoroughly in distilled water with simultaneous addition of sodium aluminate for about 8–10 hrs. to obtain amorphous alumino-silicate gel. This amorphous alumino-silicate gel was then subjected to crystallisation preferably between 90–110 C. for about 2–4 hrs. The solid crystalline product was recovered by filtration and washed thoroughly till the filtrate pH reached 10–11 and was dried at a temperature of about 50–60° C.

SUMMARY OF THE INVENTION

The present invention is to provide a cost effective process for the production of flyash based zeolite_A (FAZ-A) with improved characteristics as detergent builder.

DETAILED DESCRIPTION OF THE INVENTION

Accordingly, the present invention provides a process for production flyash of Zeolite-A, which comprises:

(a) grinding and mixing of flyash and caustic soda in a ratio of 1:1.2 and optionally adding sodium aluminate or aluminium hydroxide to obtain a fine homogeneous fusion mixture;

(b) heating the said mixture in an inert vessel at about 500–600° C. for about 1–2 hrs. to obtain a fused mass;

(c) cooling, milling and mixing the said fused mass in distilled water for about 8–10 hrs. with simultaneous optional addition of sodium aluminate or alum in the presence or absence of NaCl followed by optional seeding to obtain amorphous alumino-silicate slurry sulphate (alum) in place of sodium aluminate in the step (c) to obtain the said slurry;

(d) subjecting the said slurry as obtained in step (c) above to hydrothermal crystallisation at about 90–110° C. for 2 to 4 hrs. to obtain Zeolite A crystals, and (e) washing the said crystals with water and then subjecting the washed crystals to oven drying at about 50–60° C. to obtain the FAZ-A crystals.

According to the present invention, the sodium aluminate in solution form preferable has the following composition NaOH/Al(OH)$_3$=1.08–2.72.

In the present invention, it is preferable to add the commercially procured solid sodium aluminate in fusion step and the ratio of the flyash and commercially procured solid sodium aluminate ranges between 2.5–2.8. Otherwise, the preferred ratio of flyash and aluminium hydroxide is 5.0 to 6.6. Preferably, the flyash and alum ratio is 1:1 and the solid to liquid ration is maintained at 1:10. Further, the Zeolite-A seeding added to the fused mass is in the range of 1–2.5%. In addition, the mixing time selected in step (c) varies between 8–10 hrs. If desired, neutral salf like sodium chloride can be added to the reaction mixture in step (c). Furthermore, the hydrothermal creystallisation temperature employed in step (d) varies from 90–110° C. and the hydrothermal crystallisation time varies from 2–4 hrs.

According to the present invention, Zeolite A seeding is prepared by vigorously stirring aluminate and silicate solution for 15 minutes to obtain a homogeneous gel followed by hydrothermal crystallization at 90–110° C. for 3–4 hrs. with subsequent filtration and drying. In another feature of the present invention, the aluminate solution used for preparation of Zeolite A seeding is prepared by dissolving NaOH and aluminium hydroxide in distilled water at 100° C.

According to another feature of the present invention, the silicate solution for Zeolite A seeding is prepared by dissolving sodium silicate tin distilled water at 50° C.

One embodiment of the present invention provides flyash based Zeolite-A having the following characteristics:

Calcium binding capacity up to 500 meq/100 g,

Specific surface area up to 650 m$^2$/g,

Loss on ignition at 800° C. up to 21%, d50 or average particle size of less than 4 microns, Crystallinity of 90–95%, Cubic crystal structure, and Exchangeable action is sodium ion.

The process formulated in the present invention has several advantages which are as follows:

The modified/improved fusion step employed results in the formation of sodium silicate and sodiumaluminate, thus ascertaining the probability of formation of zeolitic phases with high purity. Proper mechanical treatment (grinding and mixing) of fusion mixture ensures complete fusion, and effective extraction of alumina/silica from flyash with formation of homogenous alumino-silicate gel.

Proper grinding and mixing of fusion mixture also avoids the formation of glassy phase and sintering of flyash particles. This also helps in increasing fusion temperature for better extraction of aluminosilicates from flyash, without sintering of particles.

The addition of sodium aluminate in active form in the mixing step resolves the handling and heat transfer problems associated with addition of sodium aluminate in fusion step. Sodium aluminate in the solution form is more homogeneously and effectively available of Zeolite-A formation.

The optimal concentration of sodium aluminate addition favours maximum FAZ-A formation.

The hydrothermal conditions employed results in the crystallisation of FAZ-A exclusively.

High concentration of alkali and promoters in the form of trace elements and certain salts provides conditions for faster crystallization of FAZ-A.

The crystallinity of FAZ-A is significantly high (90–95%), which is important for its possible industrial applications eg. as detergent builder.

Characterisation of FAZ

Calcium Binding Capacity

The Calcium Binding Capacity (CBC) of aluminosilicates was determined as follows: 1 liter of aqueous solution containing 0.5 g of CaCl$_2$ and adjusted to a pH of 9–10 with dilute NaOH, was mixed with 1 g of aluminosilicate (FAZ-A). The suspension was then stirred vigorously for 15 minutes at room temperature (29–30° C.). After filtration, the residual hardness of the filtrate was determined. From the difference between hardness of the original solution and filtrate the CBC is calculated as meq/100 g. The FAZ-a samples were dissolved in HNO$_3$ and analysed by ICP-AES (Model: YJ24) for $Al_2O_3$ while $SiO_2$ was estimated using instrumental/conventional method. $Na_2O$ was estimated using flame photometer (Mediflame-127 with FPM compressor unit 122).

Crystallographic and Morphological Observations

The surface morphology of the zeolite was examined by Jeol-840-A scanning electron microscope (Sem). Powder XRD analysis was employed to monitor zeolite formation process, using CuK as source of X-ray (Model: Philips PN-1830). d-spacing values (in A°) reported in literature of Seolite-A (12.20±0.20, 8.60±0.20, 7.05±0.15, 4.07±0.08, 3.68±0.07, 3.38±0.06, 3.26±0.05, 2.96±0.05, 2.73±0.05, 2.60±0.05) have been used as basis for identification and quantification of crystalline phases.

BRIEF DESCRIPTION OF THE ACCOMPANYING DRAWINGS

Figure 1:
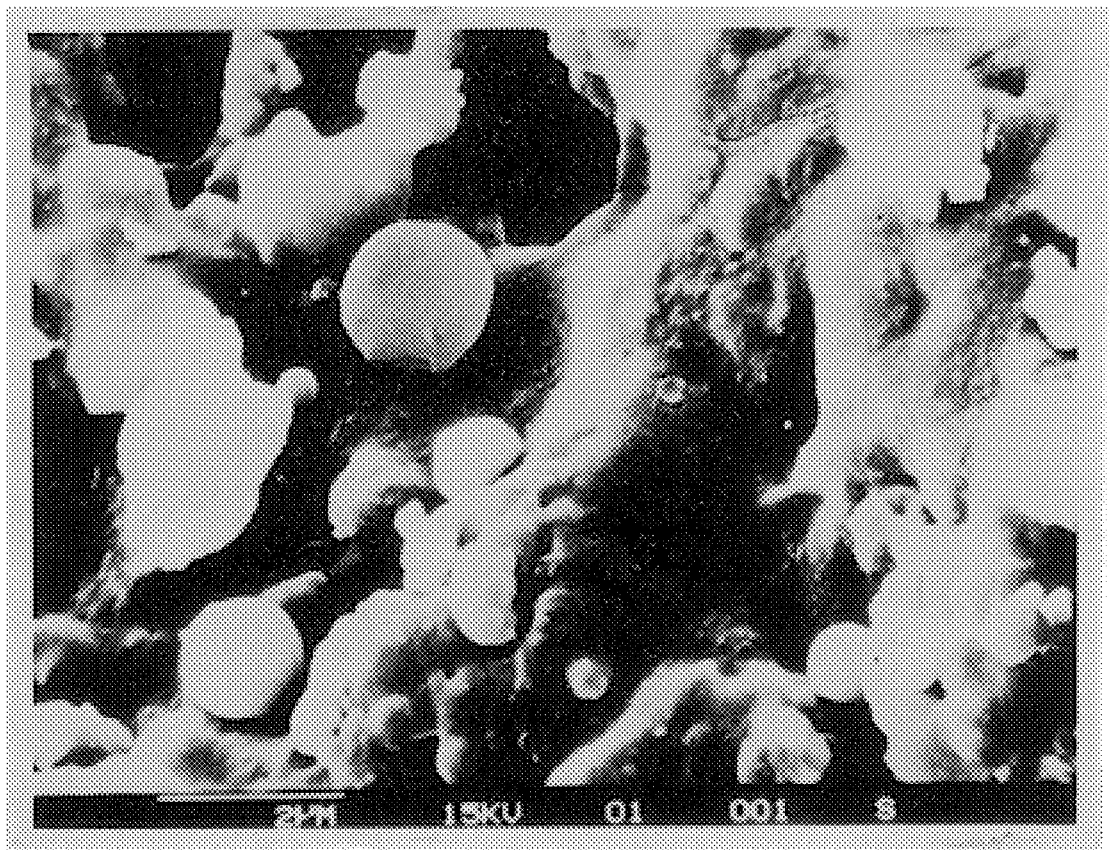
FIG. 1 shows a photograph depicting that the flyash is mainly made up of cenosphere and pleurospheres and is mostly amorphous.
Figure 2:
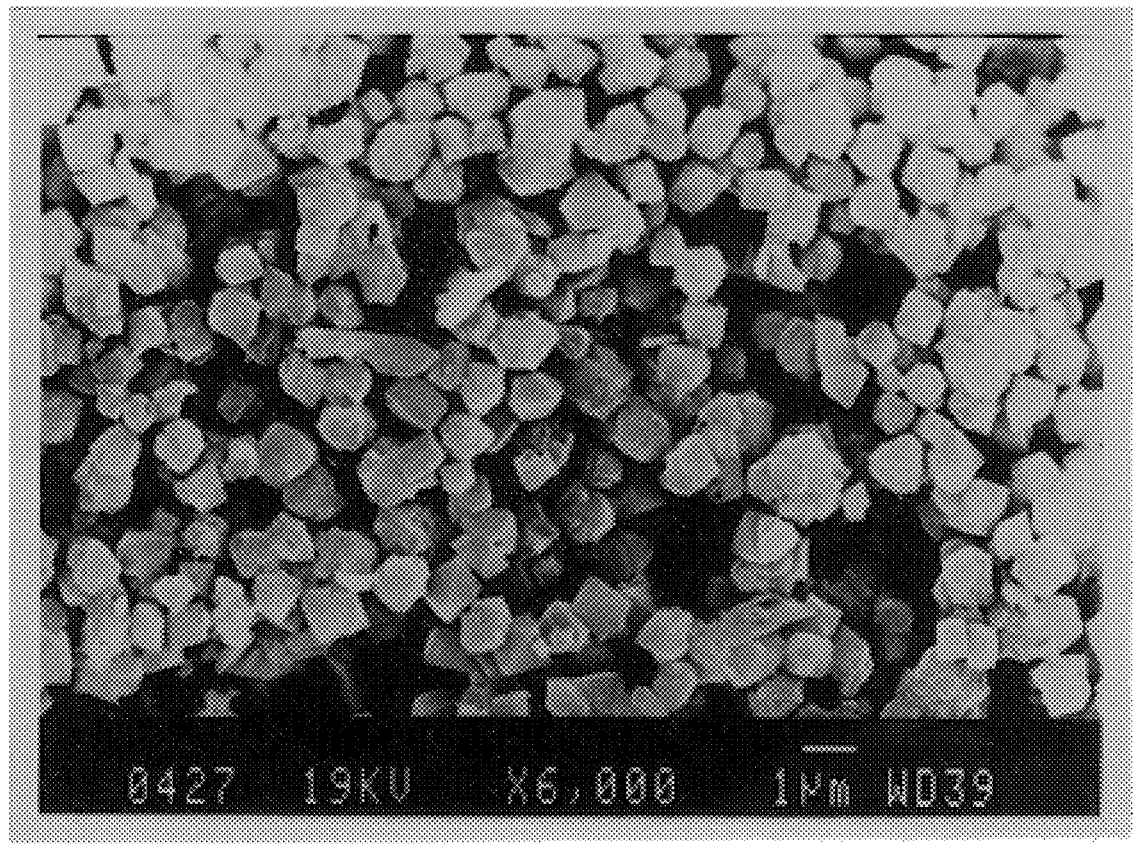
FIG. 2 shows a photograph depicting the morphology of Zeolite crystals and illustrates the transformation of amorphous flyash into crystalline material.

Comparative Analysis of FAZ-A and Commercial Zeolite-A

The chemical composition of flyash is detailed in Table 1. Comparative analysis of FAZ-A sample synthesised at optimal conditions and commercially available Zeolite-A is provided in Table 2. It is evident from the results that the synthesised FAZ-A sample matches quite well with the commercially procureed zeolite sample. The estimated cost of production is condiserably less than the conventional Zeolite-A. The advantages of synthesizing FAZ-A are as follows:

Provides an imexpensive alternative to commercial grade zeolites;

Provides effective substitute for environmentally harmful phosphatic detergent builders;

Tackless at least partially the adverse environmental effects envisaged for flyash;

High value utilisation of flyash;

Provides economically viable and technically convenient process for the production of flyash based Zeolite-A;

Highly crystalline, good quality Zeolite-A.

TABLE 1

Chemical Composition of flyash

| Component | % weight (dry basis) |
| --- | --- |
| $SiO_2$ | 1.63 |
| $Al_2O_3$ | 25.75 |
| $Fe_2O_3$ | 5.96 |
| CaO | 3.07 |
| MgO | 2.01 |
| $Mn_3O_4$ | 0.15 |
| Sulphites | Nil |
| $Na_2O$ | 0.05 |
| $K_2O$ | 0.17 |

TABLE 2

Comparative Characteristics of FAZ-A and Commercial Zeolites

| | Zeolite-4 A | |
| --- | --- | --- |
| Physical/Chemical Properties | Commercial | Synthesised |
| Calcium binding capacity (meq/100 g) | 540 | 500 |
| Loss on Ignition (%) | 20.0 | 21 |
| Average particle size (d50) (micron) | 4.0 | <4 |
| pH (5% aqueous slurry) | <12 | <11 |
| Bulk density (g/cc) | 0.45 | 0.40 |
| Crystal Shape | cubic | cubic |
| Chemical analysis (%) | | |
| $SiO_2$ | 33.0 | 32.0 |
| $Al_2O_3$ | 28.0 | 28.0 |
| $Na_2O$ | 17.0 | 19.0 |
| $H_2O$ | 22.0 | 21.0 |

The following examples illustrate the influence of different experimental parameters viz flyash/caustic soda ratio, crystallisation time/temperature but does not restrict the scope of the present invention. These examples describe the best mode of carrying out the invention.

EXAMPLE 1

Preweighed samples of flyash (20 g) and caustic soda (NaOH) (24 g) were properly grinded/milled and mixed to obtain a homogenous fusion mixture, placed in a vessel inert towards the reaction mixture and heated in a muffle furnace at around 500–600° C. for 1–2 hr. The resultant fused mass was cooled, milled and mixed thoroughly in distilled water with simultaneous addition of sodium aluminate solution (20 ml). The reaction mixture was stirred for about 8–10 hours and then subjected to crystallisation for about 3–4 hrs at about 90–110° C. The solid crystalline product was recovered by filtration, washed with water and oven dried at 50–60° C. d-spacing values (in A°) reported in literature for Zeolite-A (12.20±0.20, 8.60±0.20, 7.05±0.15, 4.07±0.08, 3.68±0.07, 3.38±0.06, 3.26±0.05, 2.96±0.05, 2.73±0.05, 2.60±0.05) compare well with FAZ-A1 and are as follows:

TABLE 3 d-spacing values obtained for FAZ-A (example 1/sample 1)

| d-spacing (A°) FAZ-A 1 Example 1 sample 1 | Relative intensity (%) FAZ-A 1 Example 1 sample 1 |
| --- | --- |
| 11.99 | 40.7 |
| 8.58 | 24.9 |
| 7.01 | 23.0 |
| 4.07 | 39.8 |
| 3.68 | 92.8 |
| 3.39 | 25.0 |
| 3.26 | 68.8 |
| 2.96 | 100.0 |
| 2.73 | 24.1 |
| 2.60 | 70.2 |

The above said sodium aluminate solution was prepared by refluxing 20–22 g of aluminum hydroxide and 60–65 g of caustic soda (NaOH) in 50–100 ml of water. The CBC for this particular FAZ is 420 meq/100 g. The loss on igniton (LOI) at 800° C. is 20%

The above mentioned characteristics of FAZ-A are quite comparable with commercial zeolite-A being used as a detergent builder.

EXAMPLE 2

Preweighed samples of flyash (20 g) and caustic soda (NaOH) (24 g) were properly grinded, milled and mixed to obtain a homogenous fusion mixture, placed in a vessel inert towards the reaction mixture and heated in a muffle furnace at around 500–600° C. for 1–2 hr. The resultant fused mass was cooled, milled and mixed thoroughly indistilled water with simultaneous addition of sodium aluminate solution (20 ml) and sodium chloride (5 g). The reaction mixture was stirred for about 8–10 hours and then subjected to crystallisation for 2,3 and 4 hrs. The solid crystalline product was recovered by filtration, washed with water and oven dried at 50–60° C. d-spacing values (in A°) reported in literature for Zeolite-A (12.02±0.20, 8.06±0.20, 7.05±0.15, 4.06±0.08, 3.68±0.07, 3.38±0.06, 3.26±0.05, 2.96±0.05, 2.73±0.05, 2.60±0.05) compare well with FAZ-A2 (2 hrs), FAZ-A3 (3 hrs) and FAZ-A4 (4 hrs) and are as follows:

TABLE 4 d-spacing values obtained for FAZ-A (example 2/sample 1–3)

| d-spacing (A°) | | | Relative intensity (%) | | |
|---|---|---|---|---|---|
| FAZ-A2 | FAZ-A3 Example2 | FAZ-A4 | FAZ-A2 | FAZ-A3 Example2 | FAZ-A4 |
| Sample 1 | Sample 2 | Sample 3 | Sample 1 | Sample 2 | Sample 3 |
| 12.19 | 12.23 | 12.27 | 66.6 | 73.0 | 42.6 |
| 8.63 | 8.66 | 8.69 | 50.3 | 59.0 | 42.6 |
| 7.04 | 7.07 | 7.10 | 46.0 | 57.6 | 42.6 |
| 4.08 | 4.08 | 4.09 | 49.6 | 51.6 | 35.4 |
| 3.69 | 3.70 | 3.64 | 84.3 | 92.0 | 100.0 |
| 3.39 | 3.40 | 3.41 | 26.0 | 31.3 | 23.1 |
| 3.27 | 3.28 | 3.28 | 75.2 | 77.0 | 52.4 |
| 2.97 | 2.97 | 2.98 | 100.0 | 100.0 | 67.9 |
| 2.74 | 2.74 | 2.75 | 25.0 | 21.1 | 18.8 |
| 2.61 | 2.61 | 2.62 | 56.2 | 45.9 | 41.9 |

The above said sodium aluminate solution was prepared by refluxing 20–22 g of aluminum hydroxide and 60–65 g of caustic soda (NaOH) in 50–100 ml of water. The CBC for these FAZs are FAZ-A2: 360 meq/100 g, FAZ-A3: 400 meq/100 g & FAZ-A4: 390 meq/100 g. The LOI at 800° C. are as follows FAZ-A2: 20%, FAZ-A3 21%; FAZ-A4: 19%.

The above mentioned characteristics of FAZ-A are quite comparable with the commercial zeolite-A being used as a detergent builder.

EXAMPLE 3

Preweighed samples of flyash (20 g) and caustic soda (NaOH) (24 g) were properly grinded/milled and mixed, to obtain a homogenous fusion mixture, placed in a vessel inert towards the reaction mixture and heated in a muffle furnace at around 500–600° C. for 1 hr. The resultant fused mass was cooled, milled and mixed thoroughly in distilled water with simultaneous addition of sodium aluminate solution (20 ml), seeding (1–2.5%) and sodium chloride. The reaction mixture was stirred for about 8–10 hours and then subjected to crystallisation for 2.5 and 3 hrs. The solid crystalline product was recovered by filtration, washed with water and oven dried at 50° C. The above said Zeolite-A seeding was prepared by vigorously stirring aluminate and silicate solution for 15 minutes to obtain a homogeneous gel, followed by hydrothermal crystallization at 90°–110° C. for 3–4 hrs with subsequent filteration and drying. The aluminate solution for Zeolite-A for seeding was prepared by dissolving NaOH (15.90 gm) and aluminium hydroxide (21.64 gm) in distilled water (90 gms) at 100° C. A silicate was prepared by dissolving sodium silicate (25.56 gm) in distilled water (210 gm) at 50° C. The addition of seeding promotes better crystallisation. The characteristics of other FAZ-A samples may also be improved with seeding. d-spacing values (in A°) reported in literature for Zeolite A (12.20±0.20, 8.06±0.20, 7.05±0.15, 4.07±08, 3.689±0.07, 3.38±0.06, 3.26±0.05, 2.96±0.05, 2.73±0.05, 2.60±0.05) compare well with FAZ-A5 (2.5 hr) and FAZ-A6 (3 hr) and are as follows.

TABLE 5 d-spacing values obtained for FAZ-A (example 3/sample 1–2)

| d-spacing (A°) | | Relative intensity (%) | |
|---|---|---|---|
| FAZ-A5 example 3 | FAZ-A6 example 3 | FAZ-A5 example 3 | FAZ-A6 example 3 |
| sample 1 | sample 2 | sample 1 | sample 2 |
| 12.20 | 12.22 | 90.5 | 92.4 |
| 8.64 | 8.67 | 59.7 | 68.9 |
| 7.05 | 7.07 | 55.6 | 46.8 |
| 4.08 | 4.08 | 65.7 | 55.2 |
| 3.69 | 3.70 | 92.6 | 93.3 |
| 3.40 | 3.39 | 28.1 | 20.8 |
| 3.27 | 3.28 | 77.6 | 75.5 |
| 2.97 | 2.97 | 100.0 | 100.0 |
| 2.74 | 2.73 | 21.6 | 15.5 |
| 2.61 | 2.61 | 54.0 | 58.8 |

The above said sodium aluminate solution was prepared by refluxing 20–22 g of aluminum hydroxide and 60–65 g of caustic soda (NaOH) in 50–100 ml of water. The CBC for these particular FAZs are 400 meq/100 g and 460 meq/100 g for FAZ-A5 & FAZ-A6 respectively. The LOIs at 800° C. are FAZ-A5: 20% and FAZ-A6: 23%.

The above mentioned characteristics of FAZ-A are quite comparable with commercial zeolite-A being used as a detergent builder.

EXAMPLE 4

Preweighed samples of flyash (20 g) and caustic soda (NaOH) (24 g) were properly grinded/milled and mixed, to obtain a homogenous fusion mixture, placed in a vessel inert towards the reaction mixture and heated in a muffle furnace at around 500–600° C. for 1–2 hr. The resultant fused mass was cooled, milled and mixed thoroughly in distilled water with simultaneous addition of sodium aluminate solution (20 ml) and zeolite-A seeding (1–2.5%). The reaction mixture was stirred for about 8–10 hours and then subjected to crystallisation for about 2–3 hrs. The solid crystalline product was recovered by filtration, washed with water and oven dried at 50°–60° C. d-spacing values (in A°) reported in literature for Zeolite-A (12.20±0.20, 8.06±0.20, 7.05±0.15, 4.07±0.08, 3.68±0.07, 3.38±0.06, 3.26±0.05, 2.96±0.05, 2.73±0.05, 2.60±0.05) compare well with FAZ-A7 and are as follows:

TABLE 6 d-spacing values obtained for FAZ-A7 (example 4/sample 1)

| d-spacing (A°) FAZ-A7 example 4 sample 1 | Relative intensity (%) FAZ-A7 example 4 sample 1 |
|---|---|
| 12.27 | 100.0 |
| 8.69 | 72.0 |
| 7.08 | 48.5 |
| 4.09 | 54.1 |
| 3.70 | 100.0 |
| 3.41 | 27.6 |
| 3.28 | 82.9 |
| 2.98 | 99.2 |
| 2.75 | 21.4 |
| 2.62 | 58.2 |

The above said sodium aluminate solution was prepared by refluxing 55–60 g of aluminum hydroxide and 60–65 g of caustic soda (NaOH) in 50–100 ml of water. The CBC for this particular FAZ is 500 meq/100 g. The $SiO_2/Al_2O_3$ ratio is about 1.1. The 1.01 at 800° C. is 21%. The average particle size (d50) is less than 4u. The surface area is about 600 m²/g. Morphological characterisation reveals crystalline phases with cubic structure (p 2)

The above mentioned characteristics of FAZ-A are almost similar to commercial Zeolite-A being used as a detergent builder.

EXAMPLE 5

Preweighed samples of flyash (20 g) and sodium aluminate (8 g) (commercially procured) and caustic soda (NaOH) (24 g) were properly grinded/milled and mixed, to obtain a homogenous fusion mixture, placed in a vessel inert towards the reaction mixture and heated in a muffle furnace at around 500–600° C. for 1 hr. The procedure followed subsequent to this is the same as mentioned in example 1. d-spacing values (in A°) reported in literature for Zeolite-A (12.20±0.20, 8.06±0.20, 7 05±0.15, 4.07±0.08, 3.68±0.07, 3.38±0.06, 3.26±0.05, 2.96±0.05, 2.73±0.05, 2.60±0.05) compare well with FAZ-A8 and are as follows:

TABLE 7 d-spacing values obtained for FAZ-A8 (example 5/sample 1)

| d-spacing (A°) FAZ-A8 example 5 sample 1 | Relative intensity (%) FAZ-A8 example 5 sample 1 |
|---|---|
| 11.93 | 45.9 |
| 8.53 | 30.1 |
| 6.99 | 27.4 |
| 4.06 | 44.5 |
| 3.67 | 89.4 |
| 3.38 | 24.2 |
| 3.26 | 72.3 |
| 2.96 | 100.0 |
| 2.73 | 25.9 |
| 2.60 | 69.6 |

The CBC for this particular FAZ is 380 meq/100 g. The LOI at 800° C. is 17%.

The above mentioned characteristics of FAZ-A arc quite comparable with commercial Zeolite-A being used as a detergent builder.

EXAMPLE 6

Preweighed samples of flyash (20 g) and caustic soda (NaOH) (24 g) were properly grinded/milled and mixed, to obtain a homogenous fusion mixture, placed in a vessel inert towards the reaction mixture and heated in a muffle furnace at around 500–600° C. for 1–2 hr. The resultant fused mass was cooled, milled and mixed thoroughly in distilled water with simultaneous addition of alum solution (20%). The procedure followed subsequent to this is the same as mentioned in example 1. d-spacing values (in A°) reported in literature for Zeolite-A (12.20±0.20, 8.06±0.20, 7.05±0.15, 4.07±0.08, 3.68±0.07, 3.38±0.06, 3.26±0.05, 2.96±0.05, 2.73±0.05, 2.60±0.05) compare well with FAZ-A9 and are as follows:

TABLE 8 d-spacing values obtained for FAZ-A9 (example 6/sample 1)

| d-spacing (A°) FAZ-A9 example 6 sample 1 | Relative intensity (%) FAZ-A9 example 6 sample 1 |
|---|---|
| 12.14 | 36.2 |
| 8.60 | 12.5 |
| 7.04 | 12.2 |
| 4.07 | 21.8 |
| 3.67 | 100.0 |
| 3.39 | 20.2 |
| 3.27 | 39.2 |
| 2.97 | 46.4 |
| 2.74 | 20.4 |
| 2.61 | 56.2 |

The CBC for this particular FAZ is 260 meq/100 g. The $SiO_2/Al_2O_3$ ratio is about 1.5. The LOI at 800° C. is 10%.

EXAMPLE 7

The same process was repeated for synthesis of FAZ-A as mentioned in example 1 except for addition of aluminum hydroxide (3–4 g) during fusion step instead of sodium aluminate to the reaction mixture. d-spacing values reported in JCPDS file (12-246) for Zeolite-A compare well with FAZ-A10 and are as follows:

TABLE 9 d-spacing values obtained for FAZ-10 (example 7/sample 1)

| d-spacing (A°) FAZ-A10 example 7 sample 1 | Relative intensity (%) FAZ-A10 example 7 sample 1 |
|---|---|
| 14.45 | 100 |
| 8.84 | 37.9 |
| 7.55 | 29.5 |
| 5.74 | 39.6 |
| 4.82 | 18.9 |
| 4.42 | 23.4 |
| 3.81 | 47.8 |
| 3.77 | 17.4 |
| 3.05 | 18.7 |
| 2.95 | 26.4 |
| 2.89 | 52.8 |

The CBC for this particular FAZ is 360 meq/100 g.

EXAMPLE 8

The same process was repeated for synthesis of FAZ-A as mentioned in example 1 except for variation in sodium aluminate addition. Quantity of sodium aluminate (commercially procured) added was 3.0, 5.0, 6.0, 8.0 g respectively and the FAZ-A samples so obtained were designated as FAZ-A11, FAZ-A12, FAZ-A13 and FAZ-A14. d-spacing values reported in JCPDS file (12-246) compare well with FAZ-A11, FAZ-A12, FAZ-A13 and FAZ-A14 and are as follows:

TABLE 10 d-spacing values obtained for FAZ-14 (example 8/sample 1–4)

| d-spacing A° | | | | Relative Intensity (%) | | | |
|---|---|---|---|---|---|---|---|
| FAZ-A11 | FAZ-A12 | FAZ-A13 | FAZ-A14 | FAZ-A11 | FAZ-A12 | FAZ-A13 | FAZ-A14 |
| | example 8 | | | | example 8 | | |
| sample1 | sample2 | sample3 | sample4 | sample1 | sample2 | sample3 | sample4 |
| 14.48 | 14.63 | 14.58 | 14.16 | 100.0 | 100.0 | 100.0 | 100.0 |
| 8.85 | 8.92 | 8.90 | 8.74 | 33.7 | 35.9 | 34.1 | 28.3 |
| 7.54 | 7.59 | 7.58 | 7.47 | 31.5 | 31.0 | 33.9 | 18.7 |
| 5.74 | 5.76 | 5.75 | 5.70 | 39.3 | 35.9 | 41.6 | 41.5 |
| 4.81 | 4.83 | 4.82 | 4.79 | 18.2 | 16.6 | 18.5 | 12.0 |
| 4.42 | 4.43 | 4.43 | 4.40 | 24.0 | 22.5 | 23.7 | 25.0 |
| 3.81 | 3.82 | 3.82 | 3.80 | 43.1 | 43.2 | 46.4 | 90.0 |
| 3.05 | 3.06 | 3.06 | 3.05 | 17.9 | 18.0 | 20.9 | 19.3 |
| 2.94 | 2.85 | 2.95 | 2.94 | 25.8 | 25.0 | 26.0 | 36.4 |
| 2.88 | 2.89 | 2.89 | 2.88 | 42.9 | 49.0 | 50.6 | 98.3 |

The CBC FAZ samples increases with increase in sodium aluminate addition and are as follows: FAZ-A11: 360 meq/100 g, FAZ-A12: 380 meq/100 g; FAZ-A13: 390 meq/100 g; FAZ-A14: 400 meq/100 g. The ratios of $SiO_2/Al_2O_3$ for FAZ-A-11, FAZ-A12, FAZ-A13 and FAZ-A14 are 1.16, 1.31, 1.30 and 1.2,respectively.

We claim:

1. A process for synthesis of flyash based Zeolite-A, said process comprising:
   (a) grinding and mixing of flyash and caustic soda in a ratio of 1:1.2 and optionally adding sodium aluminate or aluminium hydroxide to obtain a fine homogeneous fusion mixture;
   (b) heating said mixture in an inert vessel at about 500–600° C. for about 1–2 hrs. to obtain a fused mass;
   (c) cooling, milling and mixing said fused mass in distilled water for about 8–10 hrs. with simultaneous optional additon of sodium aluminate or alum solution, in the present or absence of NaCl followed by optional addition of zeolite-A seeding to obtain amorphous alumino -silicate slurry;
   (d) subjecting said slurry as obtained in step (c) to hydrothermal crystallisation at about 90–110° C. for 2 to 4 hrs. to obtain Zeolite-A crystals; and
   (e) washing said crystals with water and then subjecting the washed crystals to oven drying at about 50–60° C. to obtain the FAZ-A crystals.

2. A process as claimed in claim 1 wherein the Zeolite-A synthesised has the following characteristics:
   Calcium binding capacity upto 500 meq/100 g,
   Specific surface area upto 650 m$^2$/g,
   Loss on ignition at 800° C. up to 21%,
   d50 or average particle size of less than 4 microns,
   Crystallinity of 90–95%,
   Cubic crystal structure,
   Exchangeable action is sodium ions.

3. A process as claimed in claim 1 wherein the sodium aluminate used in step (c) is in solution form.

4. A process as claimed in claim 1 wherein the sodium aluminate used in step (c) is in solution form and has the following composition:
   $NaOH/Al(OH)_3$ ranging between 1.08–2.72.

5. A process as claimed in claim 1 wherein the flyash and commercially procured solid sodium aluminate used in step (a) are in a ratio between 2.5–2.8.

6. A process as claimed in claim 1 wherein the ratio of flyash and aluminium hydroxide employed in step (a) is in the range of 5.0–6.6.

7. A process as claimed in claim 1 wherein the flyash: alum ratio employed in step (a) is 1:1.

8. A process as claimed in claim 1 wherein the solid to liquid ratio is maintained at 1:10.

9. A process as claimed in claim 1 wherein the time for mixing the fused mass in distilled water varies from 8–10 hours in step (c).

10. A process as claimed in claim 1 wherein the hydrothermal crystallisation temperature is varied from 90–110° C. in step (d).

11. A process as claimed in claim 1 wherein the hydrothermal crystallisation time is varied from 90–110° C. in step (d).

12. A process as claimed in claim 1 wherein neutral salt may be added to the reaction mixture in step (c.).

13. A process as claimed in claim 1 wherein the Zeolite-A seeding is added in step (c) in the range of 1–2.5%.

14. A process as claimed in claim 1 wherein Zeolite A seeding is prepared by vigorously stirring aluminate and silicate solution for 15 minutes to obtain a homogeneous gel followed by hydrothermal carystallization at 90–110° C. for 3–4 hrs. with subsequent filtration and drying.

15. A process as claimed in claim 1 wherein aluminate solution used for preparation of Zeolite-A seeding is prepared by dissolving NaOH and aluminium hydroxide in distilled water at 100° C.

16. A process as claimed in claim 1 wherein the silicate solution for Zeolite-A seeding is prepared by dissolving sodium silicate in distilled water at 50° C.

17. A process as claimed in claim 1 wherein the solid crystalline product is recovered by filteration and is washed thoroughly till the pH of the filterate reaches 10–11.

18. A process as claimed in claim 12, wherein the neutral salt is sodium chloride.

* * * * *